US008632833B2

(12) United States Patent
Griffin et al.

(10) Patent No.: US 8,632,833 B2
(45) Date of Patent: Jan. 21, 2014

(54) LOW STARCH EXTRUSION

(75) Inventors: Mark Griffin, Pacific, MO (US); Kent Lanter, Waterloo, IL (US)

(73) Assignee: Purina Animal Nutrition LLC, Shoreview, MN (US)

( * ) Notice: Subject to any disclaimer, the term of this patent is extended or adjusted under 35 U.S.C. 154(b) by 777 days.

(21) Appl. No.: 11/646,702

(22) Filed: Dec. 28, 2006

(65) Prior Publication Data
US 2008/0160140 A1    Jul. 3, 2008

(51) Int. Cl.
*A23L 1/05* (2006.01)
*A23L 1/06* (2006.01)

(52) U.S. Cl.
USPC .......................................... 426/573; 426/104

(58) Field of Classification Search
USPC .......................................... 426/623, 573, 104
See application file for complete search history.

(56) References Cited

U.S. PATENT DOCUMENTS

| | | | |
|---|---|---|---|
| 3,881,024 A | 4/1975 | Pahoundis et al. ............ 426/578 |
| 3,889,007 A | 6/1975 | Gunter et al. | |
| 3,982,003 A | 9/1976 | Mitchell et al. .................... 426/1 |
| 4,048,268 A | 9/1977 | Ludwig ............................ 264/15 |
| 4,310,558 A * | 1/1982 | Nahm, Jr. ......................... 426/98 |
| 4,837,112 A | 6/1989 | Calandro et al. ............. 426/463 |
| 4,892,748 A * | 1/1990 | Andersen et al. ............. 426/635 |
| 4,988,520 A | 1/1991 | Overton ........................... 426/74 |
| 5,204,102 A | 4/1993 | Coles et al. | |
| 5,217,740 A * | 6/1993 | Lanter ............................ 426/573 |
| 5,227,190 A | 7/1993 | Ward ............................. 426/641 |
| 5,683,739 A * | 11/1997 | Lanter et al. .................. 426/623 |
| 5,714,184 A | 2/1998 | Major .............................. 426/74 |
| 5,731,029 A * | 3/1998 | Karwowski et al. .......... 426/646 |
| 5,811,148 A | 9/1998 | Chiu et al. .................... 426/548 |
| 5,894,029 A | 4/1999 | Brown et al. ................. 426/302 |
| 6,299,924 B1 | 10/2001 | Chiu et al. ..................... 426/573 |
| 6,306,427 B1 | 10/2001 | Annonier et al. ............. 424/438 |
| 6,746,698 B2 | 6/2004 | Freeman ........................... 426/2 |
| 6,805,884 B2 * | 10/2004 | Kurrzinger ........................ 426/2 |
| 6,830,771 B2 * | 12/2004 | Lanter et al. .................. 426/573 |

FOREIGN PATENT DOCUMENTS

| | | |
|---|---|---|
| EP | 1 405 570 A1 | 4/2004 |
| GB | 2252710 | 8/1992 |
| WO | WO 2004/039171 A1 | 5/2004 |

OTHER PUBLICATIONS

Igoe, Robert S.; Hui, Y. H. (2001). Dictionary of Food Ingredients (4th Edition). (pp. 31, 84). Springer-Verlag. Online version available at: http://www.knovel.com/web/portal/browse/display?_EXT_KNOVEL_DISPLAY_bookid=1092&VerticalID=0.*
Abstract, JP 62-151145, Jul. 6, 1987, San Ei Chem Ind Ltd.
International Search Report from counterpart foreign application No. PCT/US2007/025070 filed on Dec. 7, 2007.

* cited by examiner

*Primary Examiner* — Jyoti Chawla
(74) *Attorney, Agent, or Firm* — Dorsey & Whitney LLP; Bridget M. Hayden, Esq.

(57) ABSTRACT

The present invention includes methods for producing an extruded food particle by extruding through an extruder having a screw within a barrel, a composition containing nutritional food components, essentially no starch and a gum in an amount sufficient to act as a binder once the composition exits the extruder. The present invention also includes extruded food particles that do not use starch as a binder.

41 Claims, 1 Drawing Sheet

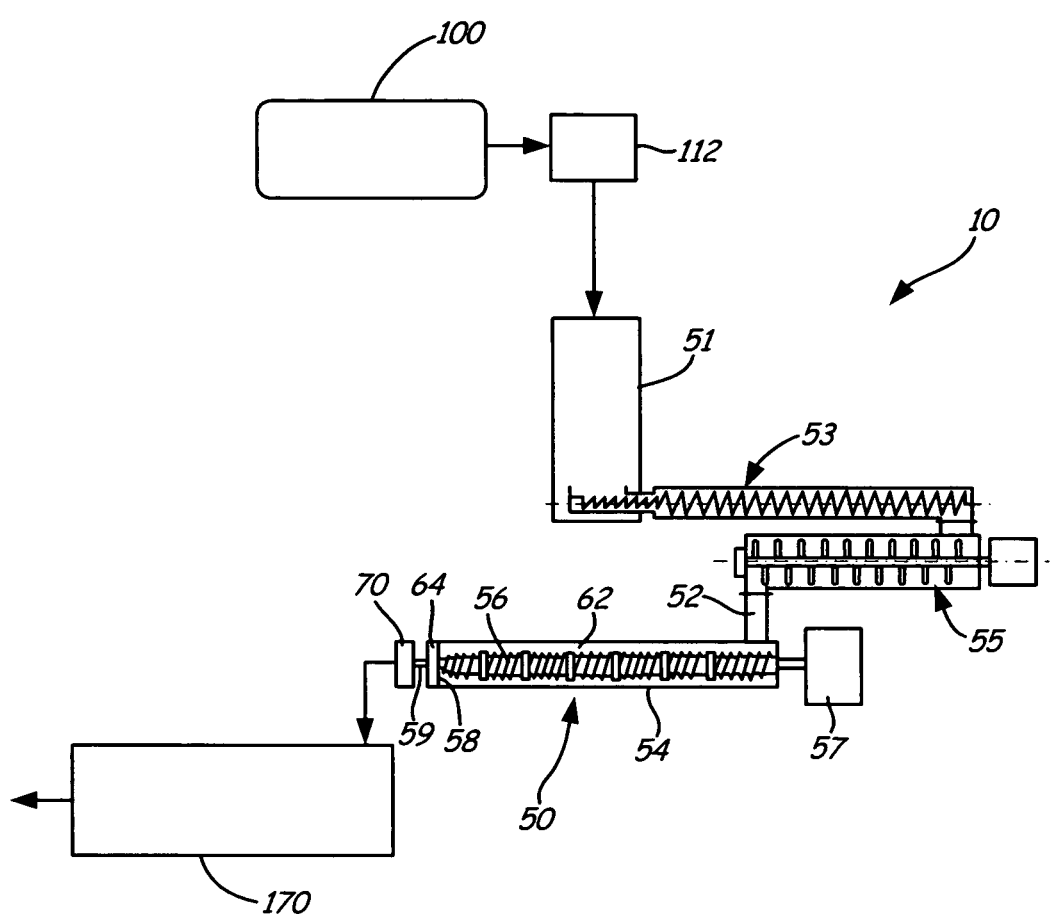

LOW STARCH EXTRUSION

CROSS-REFERENCE TO RELATED APPLICATION

None.

BACKGROUND OF THE INVENTION

The present invention generally relates to extrusion of feed and food products. More specifically, the present invention relates to methods of extruding feed and food products that uses a heat-set gum rather than starch as a binder during extrusion. The present invention also includes extruded feed and food products that contain a heat-set gum as the binder and little, if any starch.

Extrusion cooking devices have long been used in the manufacture of a wide variety of edible and other products such as human food and animal feeds. For example, large extruders have been used for many years for the production of dry chunk-type dog foods. Generally speaking, such equipment includes an extruder having an elongated, tubular barrel with one or two elongated, helically flighted, axially rotatable screws therein. A multiple-orifice die is normally attached to the outlet end of the extruder barrel and is the prime means for shaping of the extrudate.

In use, a material to be processed is passed into and through the extruder barrel and is subjected to increasing levels of temperature, pressure and shear. As the material emerges from the extruder die, it is fully cooked and shaped and may typically be subdivided using a rotating knife assembly. Conventional extruders of this type are shown in U.S. Pat. Nos. 4,763,569, 4,118,164 and 3,117,006.

Materials undergoing extrusion typically include a binder to improve internal cohesive strength so that the final product is less likely to fracture and create dust and wastage. Starch is a preferred binder for extruding food products since conditions used during extrusion facilitate starch gelatinization that helps adhere each of the food components to one another in the final extruded product.

Unfortunately quantities of starch are not always desired in food products, for many animals, such as gorillas, dogs, cats, horses, humans and the like. As a result, it is desired to have product available containing virtually no starch.

SUMMARY OF THE INVENTION

The present invention includes a method for producing a food by processing through an extruder having a screw within a barrel, a composition containing nutritional food components to form a food particle. The composition has essentially no starch and a gum in an amount sufficient to act as a binder once the composition exits the extruder.

BRIEF DESCRIPTION OF THE DRAWINGS

The FIGURE is a schematic view of a process that is used to produce an extruded food particle in accordance with the present invention.

DETAILED DESCRIPTION

The present invention includes the use of a gum as a binder rather than starch to extrude a food composition and form extruded particles. A process for producing an extruded particle is generally depicted at 10 in FIG. 1. By the term "particle" is meant a composite made of food or feed fragments bound together. In the process 10, water and a food composition containing nutritional food components, essentially no starch and a gum are introduced into an extruder 50 that includes a meal bin 51, a feeder 53, a conditioner 55, an inlet 52, an elongated tubular barrel 54, and at least one screw 56 located within the barrel 54, and an outlet 58. The extruder 50 extrudes the food composition at a temperature of at least about 180° F. to form an extruded particle in which the gum functions as a binder to bind the extruded food composition in the form of a particle after exiting the extruder 50.

Prior art particles that are made using extrusion include one or more starches. During extrusion of prior art starch containing pellets, starch gelatinizes under temperature (normally above 212° F.), pressure and shear conditions in the extruder and serves as the binding matrix that binds other food components included as part of the food composition to form a particle. As a result, the extruded particle is held together by the gelatinized starch matrix.

It has been discovered that a gum that is capable of forming a gel when heated to its solubilization temperature and subsequently cooled to a temperature of less than about 100° F. may be used as the binder that binds any food components included as part of the food composition that is subsequently extruded to form an extruded food product. The heat-settable gum sets or forms a gel that serves as the binding matrix that holds together the extruded particle after exiting the extruder rather than gelatinized starch that is normally used as a binder during extrusion.

Water is mixed with the food composition at a concentration that ranges from about 10 weight percent to about 35 weight percent of the food composition in the conditioner 55 to form a mash. In addition, steam is added to increase the temperature of the mash in the conditioner section 55. Water may also be added to the food composition in the form of steam or hot or cold liquid water when forming the heated mash. While water and/or steam may be added at the inlet, middle or outlet portion of the extruder during conventional extrusion of food products, water is preferably added to the conditioner section 55 and/or to the barrel inlets section 52, and prior to cooking in the extruder 50. The amount of water and/or steam applied to the mixture is controlled by known valving techniques in a manner to obtain desired temperatures of the conditioned meal. Additional heat is created by the mechanical energy imparted by the rotating screw and forced through a restricted orifice to cause the desired chemical and physical reactions within the heated mash. The amount of water and/or steam will vary with the nature and ratio of nutritional feed components and the other operating parameters of the extruder, such as pressure, residence time of the cooked mash and the like.

The food composition typically includes nutritional components that provide nutrition to the diet of the animal consuming the extruded food product. Nutritional components generally include protein, fat, fiber, vitamins and minerals.

Some non-exhaustive examples of nutritional components include corn, wheat, oats, barley, sorgum, rice, soybean hulls, soybean meal, aspen, amino acids, dried beet pulp, cane molasses, oat hulls, sucrose, flaxseed, soybean oil, Brewers yeast, poultry meal, chicken meal, fish meal, oat bran; vitamins, such as riboflavin, d-alpha-tocopheryl acetate, tocopherols, biotin, cholecalciferol, calcium panthothenate, vitamin A acetate, vitamin K, ascorbic acid, pyridoxine, thiamin mononitrate, nicotinic acid, cyanocobalmin, and choline chloride; minerals, such as sodium sesquicarbonate, salt, dicalcium phosphate, monocalcium phosphate, magnesium sulfate, potassium sulfate, calcium carbonate, magnesium oxide, calcium propionate, manganous oxide, zinc oxide, ferrous carbonate, copper sulfate, zinc sulfate, calcium iodate, cobalt carbonate, and sodium selenite; and any combination of any of these. Suitable examples of food compositions that contain an effective source of nutritional components for use in the present invention are Mazuri® Wild Herbivore Diet Hi-Fiber MZF1, 5MG7 Herbivore Diet, are available from PMI Nutrition International, LLC of Brentwood, Mo.

Typically, the food composition that contains nutritional food components, such as protein, fat, carbohydrates, vitamins, minerals and other components along with the heat-settable gum are first blended in a ribbon mixer 100 to form a relatively homogeneous mixture. The homogenous mixture is then ground in a grinder 112, such as a Hammermill grinder to form a ground mixture having a particle size that is less than about ⅛ inch in size. After grinding, the ground mixture and water are processed in the extruder 50 to form an extruded product. The extruded product is transferred from the extruder 50 into a horizontal dryer 170 that reduces the moisture content of the extruded product.

In general, the heat-settable gum of the food composition may have a concentration of from about 0.05 to more than about 30 weight percent, based on the weight of the food composition and preferably 0.2 to about 15 weight percent and most preferably about 0.5 to 5% weight percent. When the final extruded product has a particle size of less than about ⅜ inches, about 0.2 to about 3.0 weight percent of the heat-settable gum is generally used during extrusion while about 3 to about 5 weight percent of the heat-settable gum is included when the final extruded particle has a particle size of ⅜ inch or larger. When forming an extruded food product for an herbivore, the concentration of the heat-settable gum typically ranges from about 0.1 weight percent to about 15 weight percent during extrusion.

As used herein, the terms "heat-settable gum" and "heat-set gum" refer to gums that solubilize (hydrate) at an elevated temperature and then set when cooled and preferably form a gel. The temperature at which the gum solubilizes (hydrates) and the temperature at which the gum "sets" (gels) will vary with the particular gum used. Table 1 below illustrates such variations in both solubilizing temperatures and gel temperatures.

| Gum | Solubilizing (Hydration) Temperature | "Set" (Gel) Temperature |
| --- | --- | --- |
| Agar | 180-212° F. | 90-105° F. |
| Kappa Carageenan | 108° F. | 75-80° F. |
| IOTA Carageenan | 180° F. | 75-80° F. |
| Pectin | 150-190° F. | Sets upon cooling, gel temperature varies with $Ca^{++}$ concentration |
| Konjac | 180-195° F. | Sets upon cooling (wide variation of gel temperature) |

The terms "heat-settable gum" or "heat-set gum" may also be characterized as any water-soluble fiber that is capable of forming a gel or three-dimensional network when heated to an elevated temperature such as at least about 140° F. and subsequently cooled to a temperature in which the gum "sets" (gels) which may typically be less than about 120° F. The heat-settable gum is capable of binding any other components of the food composition that are mixed with the heat-settable gum when practicing the present invention.

By "soluble fiber" is meant a fiber source or polysaccharide that is soluble in water and not capable of digestion by human and monogastric animal enzymes. Furthermore, the term "soluble fiber" is not meant to include insoluble fiber or fiber that is not soluble in water.

The heat-settable gums preferred for use in this invention may also be characterized as water-soluble hetero-polysaccharides which are substantially non-digestible by monogastric animals and humans. The heat-settable gum preferably includes monosaccharides other than glucose, but may include glucose linked to diverse monosaccharides by glycosyl bonds which resist attack by digestive enzymes. Representative monosaccharides of heat-settable gums include mannose, galactose, xylose, glucose and sugar acids, such as galacturonic acid and derivatives thereof. As used herein, the terms "non-digestive" or "non-digestible" means that digestive enzymes are incapable of depolymerizing the heat-settable gums to yield mono-saccharides with nutritive value to monogastric animals and humans.

Some non-exhaustive examples of suitable heat-settable gums include locust bean gum, carrageenan, such as kappa-carrageenan and iota-carrageenan, konjac, agar, pectins, gellan, or any combination of any of these. The present invention preferably avoids the use of gums derived from alpha-cellulose, microcrystalline cellulose, other homo-polysaccharides derived from glucose, or any combination of any of these to form the extruded particle.

By "essentially no starch" is meant that starch has a concentration of less than about 15 weight percent as part of the food composition of the final dried extruded product exiting the extruder. For example, the concentration of starch is less than about 15 weight percent when forming an extruded product that is suitable for consumption by a cat, monkey, horse, other hoof-stock animals, and any other herbivore, omnivore, or carnivore. Furthermore, by "essentially no starch" is also meant the starch is in insufficient amount to serve as the binder for the extruded product upon exiting the extruder or in insufficient amount to make the particles durable enough for handling by conveying equipment.

As used herein, the term "starch" refers to a polymer of glucose or a homo-polysaccharide made up of glucose molecules that are easily digested and can be readily hydrolyzed by typical mono-gastric animal or human digestive enzymes, such as amylase. By "homo-polysaccharide" is meant a polysaccharide that contains only one type of sugar molecule. The term "starch" includes both unrefined starch that may be found as part of grain components of the extruded food or feed, refined starch or both.

The amount of nutritional food components may vary with the design of the extruder 50 and its operating conditions. In addition, the concentration of water of both the extruded food particle and the heated mash in the extruder before, during and subsequent to its cooking can also vary.

The extruder 50 may be any conventional extrusion device, such as that described in U.S. Pat. No. 3,496,858. As used herein, the term "extruder" or "extrusion cooker" refers to a cooking device that includes a tubular barrel 54 having an inlet 52 and an outlet 58 and presenting an inner surface defining an elongated bore 62. The "extruder" or "extrusion cooker", as used herein, also includes at least one elongated, helically flighted screw assembly 56 within the bore 62 whether the flights are continuous or interrupted, motive means 57 for axially rotating the screw assembly, and an apertured extrusion die 64 disposed across the barrel outlet. The die 64 contains at least one restricted orifice and the cooking device generally operates under high temperature and pressure conditions that shear, cook and plasticize the heated mash passing therethrough. Furthermore, it is to be understood that the terms "extruder" or "extrusion cooker" are not meant to encompass "pellet mills" that are used to form pellets by compressing ingredients together.

As noted, water and the ground mixture are fed to the extruder 50, typically through the conditioner. The extruder usually operates at a temperature of at least about 180° F. and this temperature in combination with the pressure caused by the action of the rotating screw on the heated mash and the friction between the moving heated mash and the component parts of the extruder 50 result in a pressure within the extruder sufficient to maintain temperature. The heated mash is mechanically worked by the rotating screw operating at a speed sufficient to make the mash flow in a generally fluid manner and form a plasticized dough.

The action of the rotating screw and extruder conditions of temperature and pressure maintain the plasticized dough in a homogeneous, free-flowing state. After the dough has been sufficiently cooked, sheared and plasticized, the plasticized dough is forced through the die located at the outlet of the extruder 50.

Since the extruded food product emerges from an environment of high temperature (commonly at about 250° F.) and pressure into an environment of lower temperature and pressure, such as ambient or room temperature and pressure, the extrudate expands upon leaving the extruder 50. Entering into a lower temperature and pressure results in a cooling of the extrudate and partial loss of water in the form of steam.

The extrudate leaves the extruder 50 in an extended ribbon 59 which is cut by any conventional cutting means, such as at least one knife or blade assembly 70 attached to the extruder to form individual particles typically having a diameter of approximately ⅛ to 2 inch. The size may be controlled by selecting a die aperture of appropriate dimensions. The length of the particles ranges from about 1/16 to about 2 inches. The extruded particles have a bulk density between about 20 and about 50 lbs per bushel upon exiting the extruder 50.

The extruded particle need not be provided to an animal in any special manner, but, in certain embodiments, the extruded product is simply fed to an animal. It is contemplated, for instance, that the extruded product may be useful in conjunction with the feeding of a horse, a cow, a sheep, a pig, a rabbit, a guinea pig, a gerbil, a cat, a dog, a fish and other aquatic animals and more generally, any other animal. It is further contemplated in some embodiments that the extruded product may be provided in a form intended and suitable for human consumption, i.e., that the "animal" is a human and that the extruded food product is intended for human consumption.

It will be appreciated that both the composition and size of the extruded product will be expected to vary depending on the animal for which the extruded product is intended. In any event, other ingredients, such as colorants, flavorings, and the like may be incorporated into the food composition when practicing the present invention.

The extruded particles may be transferred using an air conveyor between the extruder 52 and the dryer 170 or a mechanical conveyor like a belt conveyor. The integrity of the particle is important at this stage of the process. The binder gum of the present invention retains the food composition in particle form during conveyance until the particle is dried to a harder and more stable form. If an air conveyor is used to transport the extruded particle, then a higher concentration of the heat-settable gum may be required to prevent breakage and degradation of the extruded particle during transport. If a mechanical conveyor is used, then a lower concentration of the heat-settable gum may be required for transport.

In general, any dryer that is capable of reducing the moisture content of the extruded particle is suitable for use in practicing the present invention. After drying, the particles generally have a bulk density of about 20 to about 50 lbs per bushel and a moisture content of less than 12%.

The extruded particle may also be characterized in terms of percent (%) durability. As used herein, the term "percent durability" refers to an art recognized durability test, generally referred to as a K-State durability test. Modified by the use of chrome balls, and a different tumbling time. In the modified durability test, the durability of product obtained immediately after cooling when the product has a temperature within 10° F. of ambient temperature. Durability is determined by tumbling a 350 g sample of pre-sieved particles (to remove fines) with eight ⅞" chrome steel balls for 3 minutes at 50 RPM in a dust-tight 12"×12"×5" enclosure equipped with a 2"×9" internal plate affixed symmetrically along a 9" side to a diagonal of one 12"×12" dimension of the enclosure. The enclosure available from Seedboro Equipment Co. is rotated about an axis perpendicular to and centered on the 12" sides thereof. After tumbling, fines are removed by screening, and the particle sample is re-weighed. Percent (%) durability is defined as:

$$100 \times \frac{\text{Weight of particle after tumbling}}{\text{Weight of particle before tumbling}}$$

In general, the final extruded particle of the present invention has a percent durability of at least approximately 70% when practicing the present invention.

The following examples are illustrative only and not intended to limit the present invention.

EXAMPLES

Example 1

This example illustrates the use of a gum as a binder during extrusion of an animal feed having less than 4 weight percent starch. 5ZF1 Mazuri Wild Herbivore Diet Hi-Fiber meal (PMI Nutritional International, LLC of Brentwood, Mo.) having less than 4 weight percent starch was homogeneously mixed with approximately 5%, 3% and then 1% of a heat-settable gum in the form of Ticagel PF-80 (TIC gums, Inc. of Belcamp, Md.). 5ZF1 Mazuri Wild Herbivore Hi-Fiber has the following ingredients:

| Ingredient | Parts |
| --- | --- |
| Ground Soy Hulls | 50.71 |
| Dehulled Soymeal | 11.49 |
| Ground Aspen | 10.00 |
| Ground Beet Pulp | 10.00 |
| Ground Oat Hulls | 5.00 |
| Molasses | 5.00 |
| Soybean Oil | 1.76 |
| Ground Flax Seed | 1.00 |
| Brewers Yeast | 1.00 |
| Calcium Propionate | 0.50 |
| Apple Flavor | 0.30 |
| Sucrose | 0.10 |
| Vitamins, Minerals and Supplements | 3.14 |

In the three runs, Ticagel PF-80 a pet food-grade kappa-carrageenan that forms a gel, was used. The dry mixture was homogeneously mixed and then ground in a Fitzmill® Grinder (The Fitzpatrick Company of Elmhurst, Ill.) through a 4/64 inch screen.

After grinding, the dry mixture was introduced into an extruder (Model X-20, Wenger Mfg Co, Sabetha, Kan.). The extruder used an eight head screw located within the barrel of the extruder and a die positioned at the outlet of the extruder that contained one 3/16-inch hole. 6 knives were used to cut the extrudate exiting the die.

The ground dry mixture was mixed with water added at a rate of 0.40 lbs per minute at the conditioning section of the extruder. The addition of steam to the mixture formed a mash at a temperature of about 185° F. The screw was operated at a speed of about 509 RPM. In the barrel of the extruder, 1.1 lbs/min water was added. The hot mash was cooked and sheared until a plasticized mass was formed. The plasticized mass was forced through the die opening to form an extrudate having a diameter of approximately ¼ inch. The knives cut the extrudate to a length of approximately ⅜ inches to form pellets. The extrudate had a wet bulk density of about 38 lbs/bushel upon exiting the extruder.

After forming the extrudate particles, the wet extruded particles from all three runs were transported into a batch dryer and dried for approximately 15 minutes at approximately 225° F. to form extruded particles having no more than 10 weight percent moisture and a density of about 39 lbs/bu. The extruded product had a pellet durability index as shown in Table 1. All three runs produced an acceptable product in terms of durability:

TABLE 1

| Run<br>Ticagel PF-80 | K-State<br>Durability Test<br>(%) |
| --- | --- |
| 5% | 97.0 |
| 3% | 78.5 |
| 1% | 73.7 |

Example 2

5ZF1 Mazuri Wild Herbivore Diet Hi-Fiber meal (PMI International, LLC of Brentwood, Mo.) was mixed with approximately 10% of Ticagel 550 PT in a first run and 10% Guar 8/24 in a second run. (Both from TIC gums, Inc. of Belcamp, Md.). 5ZF1 contains less than 4 weight percent starch Both mixtures were homogeneously mixed and then ground in a Fitzmill® Grinder (The Fitzpatrick Company of Elmhurst, Ill.) passing through a 4/64 inch screen.

After grinding, the dry mixture was introduced into the extruder using the extruder setup as described in Example #2.

The ground dry mixture was mixed with water added at a rate of 0.43 lbs per minute at the conditioning section of the extruder. The addition of steam to the dry mixture formed a mash that had a temperature of about 208° F.

Additional water was added to the inlet of the barrel at the rate of 1.07 lbs/min. The screw was operated at a speed of about 515 RPM. The hot mash was cooked and sheared until the hot mash formed a plasticized mass. The plasticized mass was forced through the die opening to form an extrudate having a diameter of approximately ¼ inches. The knives cut the extrudate to a length of approximately ⅜ inches to form particles. The extruded particles had a wet density for both runs of about 35 lbs/bushel upon exiting the extruder.

After forming the extruded particles, the wet extruded particles were transported into a batch dryer and dried for ~15 minutes at approximately 225° F. temperature to form an extruded particle having no more than 10 weight percent moisture and a density of about 35 lbs/bu. The extruded particles of the first run (Ticagel 550 PT) had a pellet durability index of approximately 75.5%. While the second run (guar gum) formed no particles. Guar gum is not a heat set gum.

Example 3

Different levels of a kappa-carrageenan gum (Ticagel PF-80) were tested as a binder with 5MG7 Wild Herbivore Diet (from PMI International, LLC of Brentwood, Mo.). 5MG7 Wild Herbivore Diet has the following ingredients:

| Ingredient | % |
| --- | --- |
| Ground Soy Hulls | 43.50 |
| Dehulled Soymeal | 12.89 |
| Ground Aspen | 10.00 |
| Ground Beet Pulp | 10.00 |
| Ground Oat Hulls | 5.00 |
| Ticagel PF80 | 5.00 |
| Molasses | 5.00 |
| Soybean Oil | 1.78 |
| Ground Flax Seed | 1.00 |
| Brewers Yeast | 1.00 |
| Calcium Propionate | 0.50 |
| Orange Flavor | 0.40 |
| Apple Flavor | 0.30 |
| Sucrose | 0.10 |
| Vitamins, Minerals and Supplements | 3.53 |

The 5MG7 Wild Herbivore Diet was extruded (Wenger X-200, Wenger Manufacturing Co, Sabetha, Kan.) without a binder and produced particles that would not hold together.

TABLE 2

| 5MG7<br>Herbivore | No Binder | 1% Gum<br>Meal not<br>Ground | 1% Gum<br>not Ground<br>7/32" Die | 3% Gum<br>Grind<br>(6/64 Screen)<br>7/32" Die |
| --- | --- | --- | --- | --- |
| Particle<br>Durability | No<br>Particle | Not<br>Acceptable<br>Particles | No acceptable<br>Particles<br>Made | Acceptable<br>Particles |

Mixtures for all runs were homogeneously mixed according to the weight percent set forth in the Table 2. The mixtures were ground in a Bliss Eliminator Hammermill (Bliss Industries, Ponca City, Okla.) through a 4/64 inch screen. In addition, the 5MG7 Herbivore Diet with 1% Ticagel PF-80 was extruded without being ground and did not make an acceptable product.

The 5MG7 Herbivore Diet was also extruded using 1% and 3% Ticagel PF-80. The four products were formed into biscuits (⅜×⅝×1¾ inches).

TABLE 3

| | ⅜ × ⅝ Particle | | |
| --- | --- | --- | --- |
| 5ZF1<br>Herbivore | 1% Gum<br>Grind<br>(6/64 Screen) | 3% Gum<br>Grind<br>(6/64 Screen) | 5% Gum<br>Grind<br>(6/64 Screen) |
| Particle Durability | Not Acceptable | Not Acceptable | Acceptable |

In all cases, the biscuits did not hold together when transported using an air system from the extruder to the dryer. It is believed that a product at a 3% gum level would have been satisfactory if a mechanical conveyor system were used to transport the particles from the extruder to the dryer instead of an air system.

A separate run using 5% 5MG7 Herbivore Diet to produce a particle 3/8×5/8×1¾ in size produced an acceptable product.

5MG7 Herbivore Diet when passed through a 7/32 inch die using a 1% gum level produced an acceptable product. Although not tried, it is believed that an acceptable product at a ½% gum level using the 5MG7 Herbivore Diet would also have been made.

The extrusion conditions for product that held together in an acceptable manner include the following:

TABLE 4

| Extrusion Conditions | 5MG7 Herbivore | 5MG7 Herbivore |
|---|---|---|
| Die | 7/32" | 3/8 × 5/8 oval |
| Die holes | 60 | 3 |
| Gum, % | 1 | 5 |
| Feeder, lbs/min | 70 | 70 |
| Extruder Amps | 141 | 135 |
| Bulk Particle Density Wet, lbs/bu | 37 | 34-36 |
| Product length, inches | ¾ | 1¾ |
| Number of Knife Blades | 6 | 6 |
| Grind (Screen Size) | 6/64 | 6/64 |

Example 4

The purpose of this Example is to produce a particle feed for cats. Cats do not digest starch well and it would be advantageous to be able to produce an extruded feed having a cat diet with essentially no starch. An exotic cat diet XMG 5M543 (PMI International, LLC of Brentwood, Mo.) was mixed with 1½% Ticagel PF-80. XMG 5M543 cat diet has the following ingredients:

| Ingredient | Parts |
|---|---|
| Poultry meal | 45.90 |
| Corn Gluten meal | 9.0 |
| Beet Pulp | 9.00 |
| Dehulled Soymeal | 6.50 |
| Dried Lecithin | 1.50 |
| Fish Oil | 1.20 |
| Ticagel PF80 | 1.00 |
| Menhaden Fish Meal | 1.00 |
| Phosphoric Acid | 0.80 |
| Soy Bean Oil | 0.50 |
| Brewers Yeast | 0.50 |
| Vitamins, Minerals and Supplements | 2.43 |

The gum and the exotic cat diet were mixed and ground as described in Example 1. Both mixtures were run under the extruder conditions set forth in Table 5 below:

TABLE 5

| Extrusion conditions | 1% Gum | 0.5% Gum |
|---|---|---|
| Conditioned meal Temperature (° F.) | 206 | 207 |
| Extruder RPM | 516 | 513 |
| Extruder Amps | 20 | 22 |
| Bulk Particle Density wet, lbs/bu | 47 | 45 |
| Die Hole Diameter | 3/16 inches | |
| Number of Die holes | 1 | 1 |
| Number of knife blades | 6 | 6 |
| Particle size, approx | ¼" diameter × 3/8" long | |

The 1 and 0.5% gum levels produced a particle that held together.

The extrudate was dried as described in Example 1.

However when star shaped particles were extruded, the legs of the stars broke off.

Although the present invention has been described with reference to preferred embodiments, workers skilled in the art will recognize that changes may be made in form and detail without departing from the spirit and scope of the invention.

What is claimed is:

1. A method of forming a food product, the method comprising:
    heating a food composition comprising nutritional food factors and a heat-settable gum binder to a solubilization temperature at which the heat-settable gum solubilizes within the food composition, wherein the solubilization temperature ranges from about 108° F. to about 212° F., and wherein the heat-settable gum binder is not a homopolysaccharide comprised of glucose monomers, the gum being less than about 15 percent by weight of the food composition; and
    extruding the heated food composition through an extruder having a screw within a barrel, wherein the solubilized heat-settable gum binder remains at least at the solubilization temperature prior to exiting the extruder and cools to form a gel upon exiting the extruder and binds the food composition, the heat-settable gum binder substantially distributed throughout the food composition once the food composition exits the extruder.

2. The method of claim 1 wherein the heat-settable gum binder comprises locust bean gum, carrageenan, konjac, agar, pectin, gellan or any combination of any of these.

3. The method of claim 1 wherein the extruder is operated at a temperature sufficient to solubilize the gum.

4. The method of claim 1 wherein the heat-settable gum binder is at a concentration that ranges from about 0.05% to about 15% by weight of the food composition.

5. The method of claim 1 wherein the heat-settable gum binder is at a concentration that ranges from about 0.2% to about 5% by weight of the food composition.

6. The method of claim 1 wherein the composition has a moisture content of less than about 12% moisture by weight of the food composition after drying.

7. The method of claim 1 and further including the step of grinding the food composition before extruding in the extruder.

8. The method of claim 7 wherein the food composition has been ground through a screen having a size of about 12/64 inches or less before extruding in the extruder.

9. The method of claim 8 wherein the food composition has been ground through a screen having a size of about 6/64 inches or less before extruding in the extruder.

10. The method of claim 1 wherein the food is a particulate.

11. A particle made by the method of claim 1 characterized by its durability after extrusion and prior to drying.

12. A food product formed by the method of claim 1.

13. The food product of claim 12 wherein the heat-settable gum comprises one or more of locust bean gum, carrageenan, konjac, agar, pectin, and gellan.

14. The food product of claim 12 wherein the nutritional food factors comprise one or more of protein, fat, carbohydrates, vitamins, and minerals.

15. The food product of claim 14 wherein the carbohydrates in the nutritional food factors comprise starch, and wherein the starch comprises 4 percent or less of the nutritional food factors.

16. The food product of claim 12 wherein the nutritional food factors comprise one or more of corn, wheat, oats, barley, sorghum, rice, soybean hulls, soybean meal, aspen, amino acids, dried beet pulp, cane molasses, oat hulls, sucrose, flaxseed, soybean oil, Brewers yeast, poultry meal, chicken meal, fish meal, and oat bran.

17. The food product of claim 12 wherein the food product comprises a particulate.

18. The food product of claim 17 wherein the particulate comprises a particle size of less than about 3/8 inches and a concentration of the heat-settable gum binder ranges from about 0.2% to about 3.0% by weight of the particulate.

19. The food product of claim 17 wherein the particulate comprises a particle size of 3/8 inches or greater and a concentration of the heat-settable gum binder ranges from about 3.0% to about 5.0% by weight of the particulate.

20. The food product of claim 12 wherein the food product comprises a hoof-stock animal feed.

21. A method of forming a food product, the method comprising:
blending nutritional food components and a heat-settable gum;
grinding the blended nutritional food components and heat-settable gum to form a particulated mixture;
heating the particulated mixture and water to a solubilization temperature at which the heat-settable gum solubilizes, wherein the solubilization temperature ranges from about 108° F. to about 212° F.; and
extruding the heated particulated mixture to form the extruded food product, wherein the solubilized heat-settable gum remains at least at the solubilization temperature prior to extruding, and upon extruding, cools below the solubilization temperature to cause the gum to form a gel and bind the food components in the extruded food product.

22. The method of claim 21 wherein the heat-settable gum comprises locust bean gum, carrageenan, konjac, agar, pectin, gellan or any combination of any of these.

23. The method of claim 21 wherein the heat-settable gum is at a concentration that ranges from about 0.05% to about 5% by weight of a total weight of the food product.

24. The method of claim 21 wherein the heat-settable gum is at a concentration that ranges from about 0.2% to about 15% by weight of a total weight of the food product.

25. The method of claim 21 wherein the particulated mixture is formed by grinding the nutritional feed components through a screen having a size of about 12/64 inches or less prior to extrusion.

26. The method of claim 21 wherein the particulated mixture is formed by grinding the nutritional feed components through a screen having a size of about 6/64 inches or less prior to extrusion.

27. The method of claim 21, wherein heating the particulated mixture and water to a solubilization temperature comprises operating an extruder containing the particulated mixture at a temperature sufficient to solubilize the heat-settable gum.

28. The method of claim 27, wherein the extruder operates at a temperature of at least about 180° F.

29. A food product formed by the method of claim 21.

30. The food product of claim 29 wherein the heat-settable gum comprises one or more of locust bean gum, carrageenan, konjac, agar, pectin, and gellan.

31. The food product of claim 29 wherein the nutritional food components comprise one or more of protein, fat, carbohydrates, vitamins, and minerals.

32. The food product of claim 31 wherein the carbohydrates in the nutritional food components comprise starch, and wherein the starch comprises 4 percent or less of the nutritional food components.

33. The food product of claim 29 wherein the nutritional food components comprise one or more of corn, wheat, oats, barley, sorghum, rice, soybean hulls, soybean meal, aspen, amino acids, dried beet pulp, cane molasses, oat hulls, sucrose, flaxseed, soybean oil, Brewers yeast, poultry meal, chicken meal, fish meal, and oat bran.

34. The food product of claim 29 wherein the food product comprises a particulate.

35. The food product of claim 34 wherein the particulate comprises a particle size of less than about 3/8 inches and a concentration of the heat-settable gum binder ranges from about 0.2% to about 3.0% by weight of the particulate.

36. The food product of claim 34 wherein the particulate comprises a particle size of 3/8 inches or greater and a concentration of the heat-settable gum binder ranges from about 3.0% to about 5.0% by weight of the particulate.

37. The food product of claim 29 wherein the food product comprises a hoof-stock animal feed.

38. A method of forming an animal feed, the method comprising:
blending nutritional food components and a heat-settable gum, the nutritional food components comprising one or more of protein, fat, carbohydrates, vitamins, and minerals;
grinding the blended nutritional food components and heat-settable gum to form a particulated mixture;
heating the particulated mixture and water to a solubilization temperature at which the heat-settable gum solubilizes, wherein the solubilization temperature ranges from about 108° F. to about 212° F.; and
extruding the heated particulated mixture to form the extruded food product, wherein the solubilized heat-settable gum remains at least at the solubilization temperature prior to extruding and upon extrusion cools below the solubilization temperature to cause the gum to form a gel and bind the food components in the extruded food product.

39. An animal feed formed by the method of claim 38.

40. The animal feed of claim 39 wherein the heat-settable gum comprises one or more of locust bean gum, carrageenan, konjac, agar, pectin, and gellan.

41. The animal feed of claim 39 wherein the animal feed comprises a hoof-stock animal feed.

* * * * *